United States Patent [19]

Kiyohara et al.

[11] 4,134,652
[45] Jan. 16, 1979

[54] LIGHT MEASURING ARRANGEMENT FOR A SINGLE LENS REFLEX CAMERA

[75] Inventors: Takehiko Kiyohara, Zama; Youichi Okuno; Tokuichi Tunekawa, both of Kanagawa; Teiji Hashimoto, Kawasaki, all of Japan

[73] Assignee: Canon Kabushiki Kaisha, Tokyo, Japan

[21] Appl. No.: 760,960

[22] Filed: Jan. 21, 1977

Related U.S. Application Data

[63] Continuation of Ser. No. 495,258, Aug. 6, 1974, abandoned.

[30] Foreign Application Priority Data

Aug. 7, 1973 [JP] Japan .................. 48-88649

[51] Int. Cl.² .............................................. G03B 7/08
[52] U.S. Cl. ................................ 354/23 R; 354/56
[58] Field of Search ............ 354/22, 23 R, 54, 55, 354/56, 59, 219, 220, 221, 222, 223, 224, 225

[56] References Cited
U.S. PATENT DOCUMENTS

| 3,134,021 | 5/1964 | Ploke | 354/59 X |
|---|---|---|---|
| 3,180,218 | 4/1965 | Durst | 354/59 X |
| 3,575,095 | 4/1971 | Keck | 354/56 |
| 3,603,200 | 9/1971 | Hiruma et al. | 354/225 |
| 3,791,277 | 2/1974 | Kobori et al. | 354/51 |
| 3,967,287 | 6/1976 | Kimura et al. | 354/56 |

FOREIGN PATENT DOCUMENTS

| 69055 | 9/1969 | German Democratic Rep. | 354/54 |
|---|---|---|---|
| 4425307 | 12/1966 | Japan | 354/54 |
| 1203872 | 9/1970 | United Kingdom | 354/54 |

Primary Examiner—Michael L. Gellner
Attorney, Agent, or Firm—Toren, McGeady and Stanger

[57] ABSTRACT

In a finder optic system having the structure in which a tiltable mirror, in its reflecting position, reflects light entering through the camera objective upward onto a focusing screen where an image of the object to be photographed is formed and light from the image is radiated upward through the condenser lens and a pentaprism into an eyepiece, a light meter arrangement in accordance with an embodiment of the invention comprises a single photo-cell and a glass plate provided with an angular surface formed therein for acceptance of the photo-cell. The glass plate is cemented at one of the surfaces parallel to the exit surface of the pentaprism in front of the eyepiece and is oriented so that the angular surface is rearwardly inclined with respect to the axis of the finder optic, whereby a light beam from one of two different portions outside the central portion of the image is directed through the pentaprism with regular reflections therein to the angular surface to reach the photo-cell and a light beam from the other is directed through the pentaprism without any regular reflection to the angular surface to reach the same photo-cell. The arrangement permits the photo-cell to produce a light value which is, in effect, substantially equal to that sensed by a photo-cell positioned to receive a light beam from the central portion of the image.

9 Claims, 6 Drawing Figures

LIGHT MEASURING ARRANGEMENT FOR A SINGLE LENS REFLEX CAMERA

This is a continuation of application Ser. No. 495,258 filed Aug. 6, 1974 now abandoned.

BACKGROUND OF THE INVENTION

This invention relates to light meter arrangements for TTL (Through-the-Lens) type single lens reflex cameras. Various light meter arrangements have been proposed for the so-called "TTL" photometry systems. These conventional light meter arrangements may be classified into two main groups with respect to the position of the photo-cell. In one of which the arrangement is with a photo-cell positioned between the photographing lens and the focusing screen, and the arrangement in the other group with a photo-cell positioned between the focusing screen and the eye-piece. The invention relates more particularly to light meter arrangements in the latter group.

The prior art light meter arrangements in the latter group may be summarized as follows which will be made with reference to FIGS. 1 and 2. FIG. 1 schematically illustrates an arrangement of the basic components of a view finder for a single lens reflex camera. A tiltable mirror M which is located between a photographing lens not shown and a focal plane shutter not shown, in its reflecting position, reflects light entering through the photographing lens upward onto a focusing screen 1, where an image of the object area intended to be photographed is formed. Light from the image on the screen 1 is radiated upward through a condensor lens 2 into a pentagonal roof prism (hereinafter referred to as "pentaprism"). In the pentaprism it is reflected from one of first two reflecting surfaces $3a$ and $3a'$ constituting the roof portion of the pentaprism to a second reflecting surface or front reflecting surface $3b$, and directed therefrom through an exit surface $3c$ to an eyepiece 4. In this case, instead of using the pentaprism, it is possible to use a hollowed reflection complex having three mirrors located at positions corresponding to those of the roof and front reflecting surfaces. A character L indicates a beam of light rays entering the mirror M through the photographing lens and going upward to the eyepiece along the axis of the view finder optic.

FIG. 2 illustrates positions of photo-cells $P_1$–$P_8$ disposed between the focusing screen 1 and the eyepiece 4 and paths of light beams impinge on the photo-cells.

(1) Arrangement with photo-cell $P_1$ requires a partly mirrored surface provided in the condensor lens 2 to deflect part of the light radiated from the entire image area to the photo-cell $P_1$.

(2) Arrangement with photo-cell $P_2$ or $P_3$ requires a partly light-permeable surface provided on the first reflecting surfaces of the pentaprism at a portion to permit light rays outside of the finder light beam, or part of the light rays going to the eyepiece to reach the photo-cell $P_2$ or $P_3$.

(3) Arrangement with photo-cell $P_4$ requires a partly light-permeable surface provided on the second reflecting surface of the pentaprism at a portion to permit part of the light rays going to the eyepiece to reach the photo-cell $P_4$.

(4) Arrangement with photo-cell $P_5$ requires a partly mirrored surface provided in a beam splitter positioned between the exit surface of the pentaprism and the eyepiece to deflect part of the light rays going to the eyepiece to the photo-cell $P_5$.

(5) Arrangement with photo-cells $P_6$ and $P_6'$ requires for the photo-cells to be positioned behind the exit surface $3c$ of the pentaprism on the left and right hand sides of the beam entering the eyepiece within the light rays going toward the eyepiece but outside of the beam entering the eyepiece.

(6) Arrangement with photo-cell $P_7$ requires for the photo-cell to be positioned within the light rays going toward the eyepiece but outside of the light beam entering the eyepiece to receive a beam of light rays from an upper portion of the entire image area on the focusing screen, or a portion on the screen nearer to the lens barrel.

(7) Arrangement with photo-cell $P_8$ requires for the photo-cell to be positioned within the light rays going toward the eyepiece but outside of the light beam entering the eyepiece to receive a beam of light rays from a lower portion of the entire image area on the focusing screen, or a portion on the screen farther from the lens barrel.

Of these, arrangements (1), (2), (3), and (4), all of which employ means for deflecting part of the light beam entering the eyepiece to the photo-cell are advantageous for facilitating the photometric measurement for the light from the central portion of the entire image area and for rendering the photometric measurement reliable, because the intensity of that portion of the light radiated from the entire image area on the focusing screen which is effectively directed to the eyepiece can be measured to produce an output in good proportion to the light intensity as sensed by the photo-cell regardless of variation of the diaphragm aperture and of employment of a different interchangeable objective having different largest aperture on focal lengths of lenses. However, the brightness of the finder image is reduced at a portion, or as a whole by an amount corresponding to the deflected part of the light rays which would otherwise enter the eyepiece, thereby it being made more difficult to achieve accurate focusing operation.

The other arrangements (5), (6) and (7) are free from the above-mentioned disadvantage of providing finder images of reduced brightness due to the incorporation of the photo-cell as well as the disadvantage of producing a shadow of the photo-cell in the field of view of the finder. However, the photo-cell has to be arranged in spaced apart relation to the axis of the finder optic in a distance such that it is impossible to measure the intensity of light from the central portion of the entire image area on the focusing screen. In other words, the photo-cell $P_6$ and $P_6'$ in arrangement (5) is responsive to the light beams from portions of the image on the screen which are laterally deviated from the central portion thereof. The photo-cell $P_7$ in arrangement (6) is responsive to the light beam coming from an upper portion of the view field in the object space. The photo-cell $P_8$ in arrangement (7) is responsive to the light beam coming from a lower portion of the view field in the object space. Therefore, it has been conventionally practiced to select a plurality of photo-cells for employment in a light meter arrangement and employ an electric circuit adapted for combination of the outputs of all the photo-cells to derive an output which is in effect substantially equal to that which might have been obtained by a photo-cell arranged to receive the light from the central portion of the entire image area on the focusing screen.

SUMMARY OF THE INVENTION

An object of the present invention is to provide photo-cell means arranged in spaced apart relationship to the axis of the finder optic, while nevertheless the light value as sensed by the photo-cell means is substantially equal to that which might have been otherwise obtained by a photo-cell arranged on the axis of the finder optic to receive the light beam from a central portion of the entire image area on the focusing screen. One embodiment of the present invention comprises a single photo-cell means arranged between the exit surface of a pentaprism and the eyepiece but above the eyepiece connected optically to the roof reflecting surfaces and the front reflecting surface of the pentaprism to receive a light beam coming from a portion of the image area on the focusing screen through the entrance and exit surfaces of the pentaprism without any regular reflection therein as well as to receive a light beam from another portion of the image area on the focusing screen in a light path such that a beam of light rays radiated from said another portion enters the pentaprism in which it is reflected from the roof reflecting surfaces and the front reflecting surface in succession to the exit surface, and directed therefrom through an optical means cemented to the exit surface of the pentaprism to the same photo-cell. The invention is effective for improving the reliability of the photo-cell means in deriving a light value representative, in effect, of the central portion of the field of view of the finder without the necessity of employing a number of photo-cells and without causing any reduction of brightness of the finder image as will be seen in the case of light meter arrangement employing a partly mirrored surface arranged in the axis of the finder optics to receive a light beam from the central portion of the image area on the focusing screen.

DESCRIPTION OF THE PREFERRED EMBODIMENTS

Figure 1:
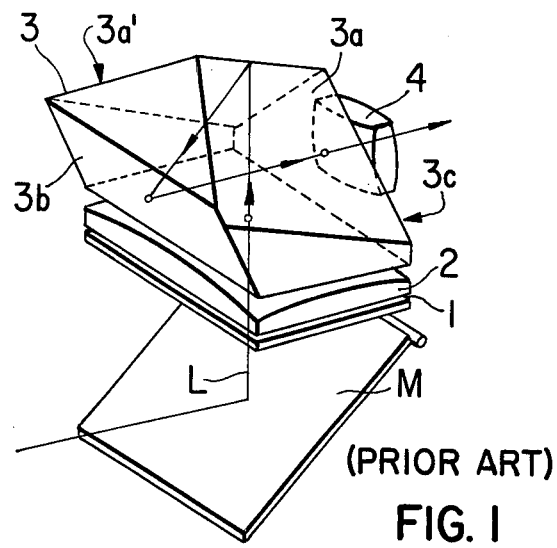
FIG. 1 is a schematic perspective view of a typical arrangement of the basic components of a finder optic for a single lens reflex camera.
Figure 2:
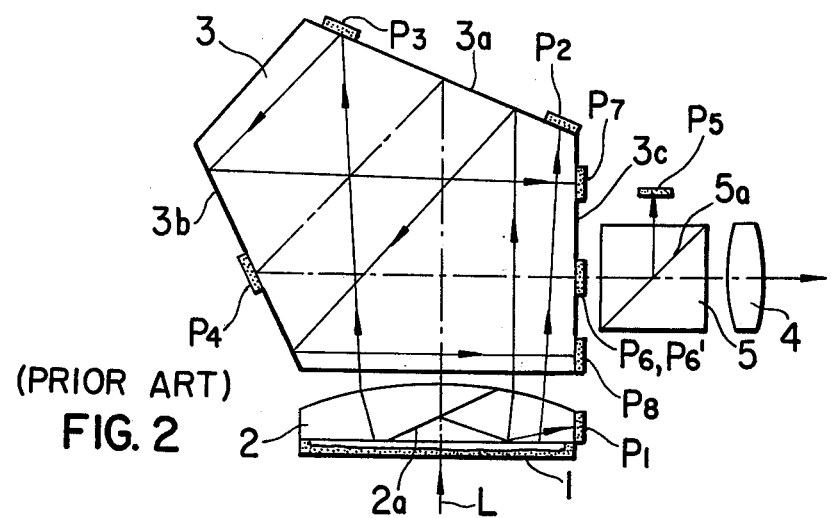
FIG. 2 illustrates photometric light paths through the components of FIG. 1 in view of conventional light meter arrangements.
Figure 3:
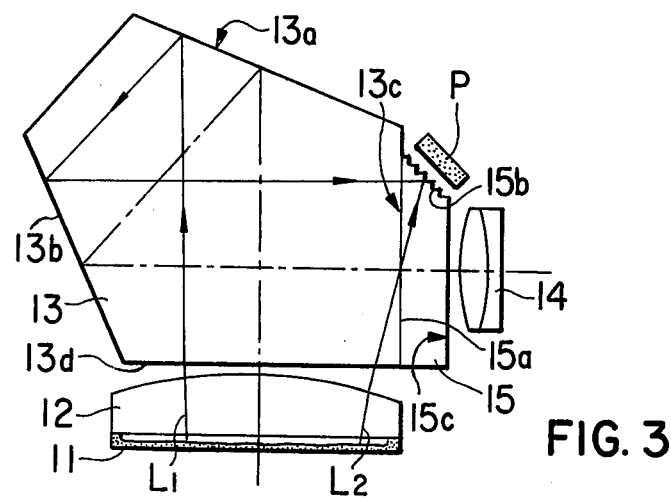
FIG. 3 illustrates a schematic sectional view according to the present invention.

Referring to FIG. 3, there is shown one embodiment of the present invention as including a focusing screen 11, a condenser lens 12, a pentaprism 13 having roof reflecting surfaces 13a, front reflecting surface 13b, exit surface 13c, and bottom surface 13d, an eyepiece 14 and an optical block 15 having a first and a second light-permeable surface 15a, 15c parallel to each other and a third light-permeable surface 15b positioned between the pentaprism 13 and the eyepiece 14. A zone above a center of a focusing screen 11 in the drawing, that is, a zone at which an upper portion of the image is formed, is designated as "the front portion of a focusing screen" in the drawing, that is, a zone at which a lower portion of the image is formed, is designated as the "rear portion of the focusing screen." The optical block 15 is cemented to the prism 13 at their adjoining surfaces 13c and 15a. A photo-cell is positioned above the optical block, so as to optically face both front reflecting surface 13b and the bottom surface 13d of the pentaprism 13. The optical block may be of a transparent plate made from an optical glass or an optical plastic and is cut out at a portion thereof to provide an angular surface 15b which is rearwardly inclined with respect to the axis of the finder optic. The surface 15b is provided with a series of small prisms, or a diffusing means to prevent the total reflection of light in entering the photo-cell P therethrough.

The light beam $L_1$ from the upper portion of the image formed on the screen 11 passes through the condenser lens 12 in a path almost parallel to the axis of the finder optic and enters the bottom surface 13d of the pentaprism 13 in which the beam $L_1$ is reflected from the roof reflecting surface 13a to the front reflecting surface 13b, and then directed through the exit surface 13c to the angular surface 15b of the optical block 15 to reach the photo-cell P.

On the other hand, the light beam $L_2$ from the lower portion of the image formed on the focusing screen 11 passes through the bottom surface 13d of the pentaprism to the exit surface 13c, and enters the optical block 15 in which it is directed through the angular surface 15b to the photo-cell P.

Figure 4:
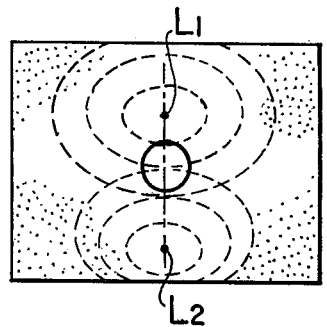
FIG. 4 is a top view of a focusing screen for use in the arrangement of FIG. 3.

As shown in FIG. 4, when only the light beam $L_1$ enters the photo-cell P, the light amount information of only the upper area of focusing screen 11 is derived and when only the light beam $L_2$ enters, light amount information of only the lower area is derived. The amount of the light beam impinging on the photo-cell P becomes maximum when the light beam is radiated from the points $L_1$ and $L_2$ in FIG. 4.

In the present invention as shown in FIG. 3, the single light-receiving means receives at the same time both the light beam from the upper area of the focusing screen and that from the lower area, so that amount of light radiated from the central area of the focusing screen increases as a result.

Figure 5:
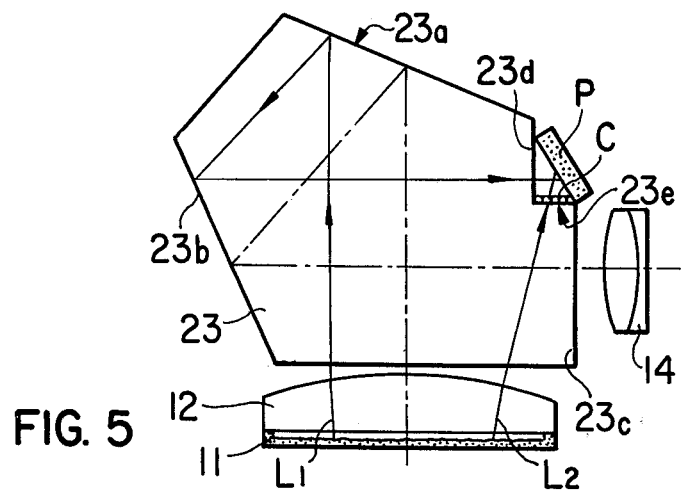
FIGS. 5 and 6 are schematic sectional views of alternate embodiments of the present invention.
Figure 6:
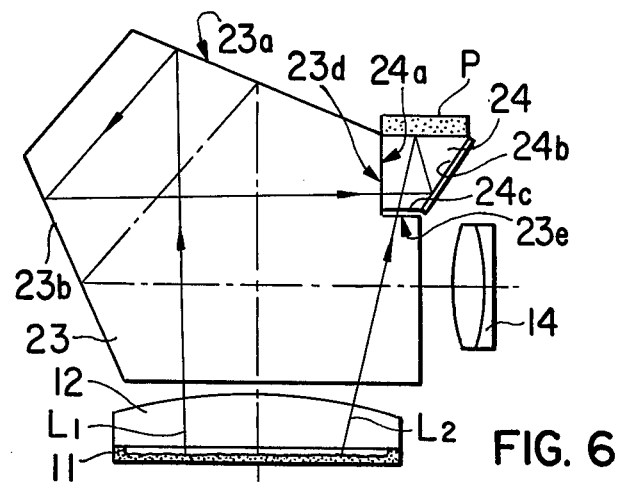

Another embodiment of the present invention is illustrated in FIG. 5, wherein a pentaprism 23 is cut out at a portion of the upper edge on the side of the exit surface to define first and second light-permeable surfaces 23d and 23e at right angles to each other, the first light-permeable surface being parallel to the exit surface of the pentaprism and the second light-permeable surface 23e being perpendicular thereto. The light beam $L_1$ is reflected from the first reflecting surface 23a to the second reflecting surface 23b, and directed therefrom to the first light-permeable surface 23d to reach the photo-cell P positioned in the cutout. The light beam $L_2$ is directed through the pentaprism without any regular reflection to the second light-permeable surface 23e to reach the same photo-cell P. In this embodiment, the light-receiving surface of the photo-cell P is inclined with respect to the axes of the light beams $L_1$ and $L_2$ to large extents. Such an orientation of the photo-cell P results in a decrease of the effective area of the light-receiving surface thereof and an increase of surface reflection. In order to minimize such dimensions, according to still another embodiment of the invention as illustrated in FIG. 7, there is provided an additional prism component 24 arranged in a space defined by the first and second light-permeable surfaces 23d and 23e and the light-receiving surface of the photo-cell P, so that a first entrance surface 34a is in contact with the surface 23d and a second entrance surface 24c is parallel to the surface 23e either in contact to, or in air spaced relation to the surface 23e. The light beam $L_1$ from the focusing screen after regular reflections from the first and second reflecting surfaces 23a and 23b of the pentaprism in succession enters the prism component 24 through the adjoining surfaces 23d in which it is reflected from the surface 24d to the photo-cell P. The light beam $L_2$ is directed through the pentaprism 23 to the exit surface thereof, and then enters the prism component 24 through the second light-permeable surface 23e and the surface 24c of the prism component 24 to reach the same photo-cell P.

For balancing the intensities of the light beams $L_1$ and $L_2$ relative to each other at the light-receiving surface of the photo-cell P, in the case of the light meter arrangement of FIG. 5, for example, a light control means C for reducing the intensity of light may be provided on the second light-permeable surface 23e. The light control means C may be of an optical coating, or is of a filter which is removably inserted between the second light-permeable surface and the photo-cell P. However, such a light control means is not always necessary in the light meter arrangement of the present invention, because an appropriate balancing between the intensities of the light beams from the upper and lower portions of the image is automatically effected in such a manner that the light beam $L_1$ from the upper portion of the view field in the object space which portion is usually composed of relatively bright objects such as sky is reflected from the first and second reflecting surfaces of the pentaprism thereby the intensity of the light beam is reduced to some extent, while the beam $L_2$ from the lower portion of the view field in the object space which portion is usually composed of relatively dark objects is directed through the pentaprism without any regular reflection therein to the photo-cell.

It will be seen from the foregoing description that the present invention provides a novel light meter arrangement comprising a single photo-cell positioned in both of the photometric light paths of the light beams from two different portions transversely deviated from the central portion of the entire image area on the focusing screen to sense a light value which may be estimated as a light value sensed by a photo-cell which is arranged to receive the light beam from an intermediate portion between the above-mentioned two different portions. As a result, the deviation of the light value as sensed by the single photo-cell from that of the central portion of the entire image can be well compensated for by employing an optical supplement of simple structure.

What is claimed is:

1. In a light measuring arrangement for a single lens reflex camera having an objective lens and a finder optical system including a focusing screen on which said objective lens forms an image of an object area, said focusing screen having front and rear portions, a pentaprism type reflection means having a bottom surface, two roof reflecting surfaces, a front reflecting surface, an exit surface and a substantially L-shaped cutout at a portion of an upper edge on the side of the exit surface of the pentaprism type reflection means to define a first and a second light-permeable surface connected optically to the front reflecting surface and to the bottom surface respectively, said pentaprism type reflection means being disposed with its bottom surface connected optically to said focusing screen, and an eyepiece connected optically to the exit surface of said pentaprism type reflection means, said arrangement also comprising a single light-receiving means connected optically to both first and second light-permeable surfaces of said L-shaped cutout provided in said pentaprism type reflection means for receiving both a light beam radiated mainly from the front portion of said focusing screen, reflected by the pentaprism type reflection means and then radiated from the first light-permeable surface of said L-shaped cutout and a light beam radiated mainly from the rear portion of said focusing screen and, without reflection by said pentaprism type of reflection means radiated from the second light-permeable surface of said L-shaped cutout.

2. A light measuring arrangement for a single lens reflex camera according to claim 1, wherein said light receiving means is disposed to be adjacent to the first and second light-permeable surfaces of said cutout and to be oblique to each of said two surfaces.

3. A light measuring arrangement for a single lens reflex camera according to claim 1, wherein a light-intensity controlling means is provided between one of the first light-permeable surface and the second light-permeable surface of said cutout and said light-receiving means for controlling the intensity of one of said light beams radiated mainly from the rear portion of said focusing screen and said light beam radiated mainly from the front portion of said focusing screen.

4. A light measuring arrangement for a single lens reflex camera according to claim 1, wherein an air gap is provided between said light-receiving means and the second light-permeable surface of said L-shaped cutout provided at said pentaprism type reflection means.

5. A light measuring arrangement for a single lens reflex camera according to claim 1, wherein an air gap is provided between the bottom surface of said prism and the second light-permeable surface of said L-shaped cutout provided at said pentaprism type reflection means.

6. In a light measuring arrangement for a single lens reflex camera having an objective lens and a finder optical system including a focusing screen on which said objective lens forms an image of an object area, a pentaprism type reflection means having a bottom surface, two roof reflecting surfaces, a front reflecting surface, an exit surface and a substantially L-shaped cutout at a portion of an upper edge on the side of the exit surface thereof to define a first and a second light-permeable surface connected optically to the front reflecting surface and to the bottom surface respectively, said pentaprism type reflection means being disposed with its bottom surface connected optically to said focusing screen, and an eyepiece connected optically to the exit surface of said pentaprism type reflection means, said arrangement further comprising a sub-prism having a first and a second entrance face, a reflecting face facing toward one of said first and second entrance faces and an exit face, and a light-receiving means optically connected to the exit face of said sub-prism, wherein said sub-prism is disposed with the first and the second entrance face connected optically to the first and to the second light-permeable surface of said L-shaped cutout of the pentaprism type reflection means respectively to direct a first and a second light beam to said light-receiving means, said first light beam being radiated mainly from a front portion of said focusing screen, reflected by said pentaprism type reflection means and then transmitted through the first light-permeable surface of said L-shaped cutout of the pentaprism type reflection means, and said second light beam being radiated mainly from a rear portion of said focusing screen and, without reflection by said pentaprism type reflection means, transmitted through the second light-permeable surface of said L-shaped cutout of the pentaprism type reflection means.

7. A light measuring arrangement for a single lens reflex camera according to claim 6, wherein the first entrance face of said sub-prism is cemented to the first light-permeable surface of said L-shaped cutout in said pentaprism type reflection means.

8. A light measuring arrangement for a single lens reflex camera according to claim 6, wherein said light-receiving means is cemented to the exit face of said sub-prism.

9. A light measuring arrangement for a single lens reflex camera according to claim 6, including a light intensity controlling means is provided between the second light-permeable surface of said L-shaped cutout in said pentaprism type reflection means and the second entrance face of said sub-prism for controlling the intensity of said second light beam.

* * * * *